Figure 1:
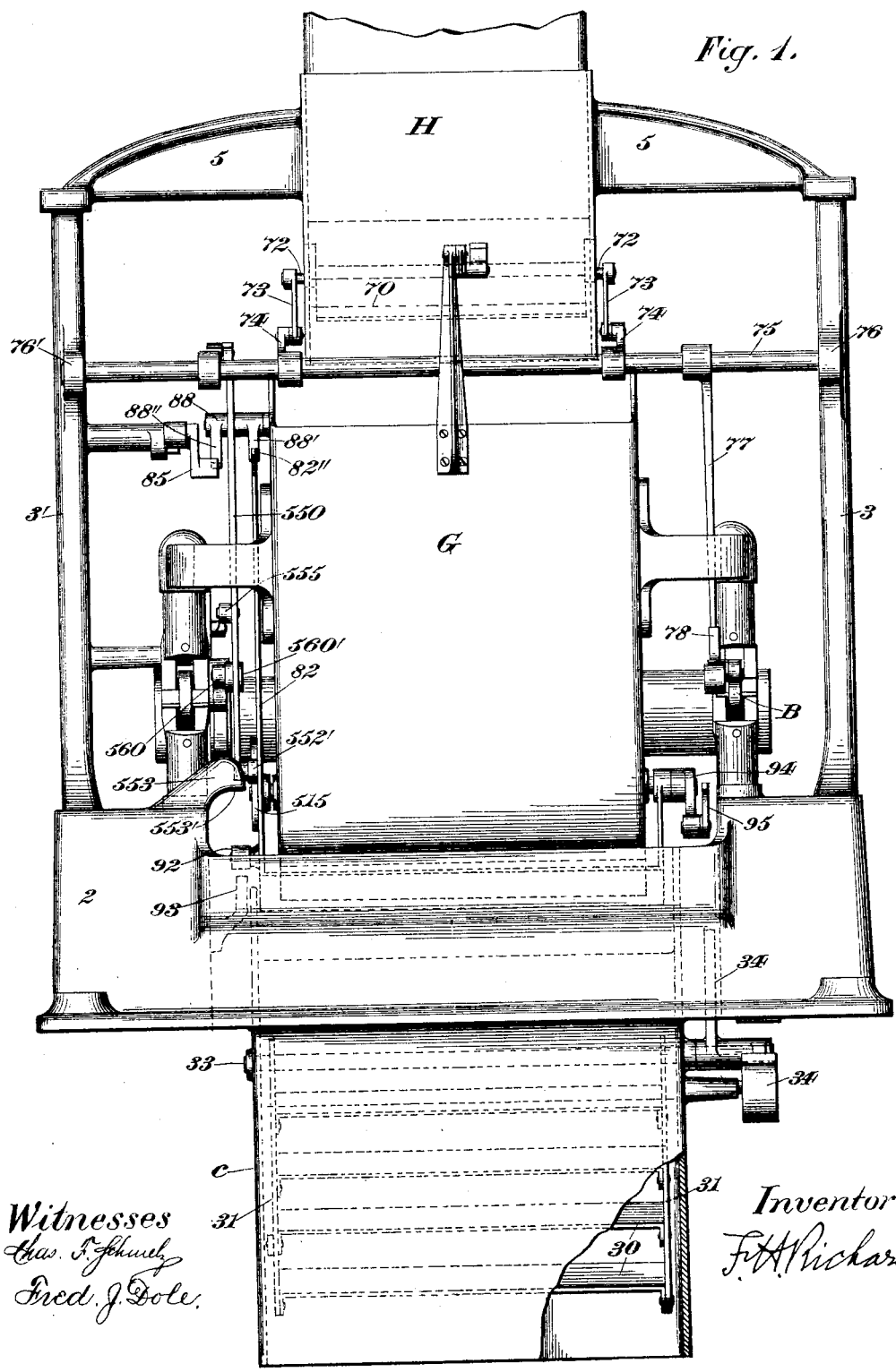

(No Model.)  6 Sheets—Sheet 1.

F. H. RICHARDS.
AUTOMATIC WEIGHING MACHINE.

No. 589,275.  Patented Aug. 31, 1897.

Witnesses
Chas. F. Schmelz
Fred. J. Dole.

Inventor
F. H. Richards.

(No Model.)

6 Sheets—Sheet 2.

F. H. RICHARDS.
AUTOMATIC WEIGHING MACHINE.

No. 589,275.   Patented Aug. 31, 1897.

Witnesses
Chas. F. Schmelz
Fred. J. Dole

Inventor:
F. H. Richards (No Model.) 6 Sheets—Sheet 5.

F. H. RICHARDS.
AUTOMATIC WEIGHING MACHINE.

No. 589,275. Patented Aug. 31, 1897.

Witnesses
Chas. R. Schmelz
Fred. J. Dole.

Inventor
F. H. Richards.

(No Model.)

F. H. RICHARDS.
AUTOMATIC WEIGHING MACHINE.

No. 589,275.  Patented Aug. 31, 1897.

6 Sheets—Sheet 6.

Witnesses
Chas. F. Schmelz
Fred. J. Dole.

Inventor
F. H. Richards.

United States Patent Office.

FRANCIS H. RICHARDS, OF HARTFORD, CONNECTICUT.

AUTOMATIC WEIGHING-MACHINE.

SPECIFICATION forming part of Letters Patent No. 589,275, dated August 31, 1897.

Application filed April 23, 1897. Serial No. 633,506. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines of that class adapted for automatically weighing predetermined quantities of material, and especially to weighing-machines of the type shown in patents heretofore granted to me in which an overload is supplied to the load-receiver of the weighing mechanism and subsequently reduced to a true load by the removal of the excess from the charge. In the constructions shown in said patents the reduction of the load has been effected generally by means of a separate load-reducer or feeder operative independently of the swinging closer or load-discharger by means of which the load is usually discharged; but in the present case it is one of the principal objects of the invention to provide a load-discharger or closer capable of operation for the purpose of reducing the overload to a true load by removing the excess of material and subsequently discharging the completed true load. For the purpose of effecting these results I prefer to make use of a load-discharger having material-discharging movements and an intermediate movement in a common path during a single cycle of operation of the weighing mechanism, the simplest construction being one in which the closer swings in one direction to reduce the load and in the opposite direction to discharge the load during such cycle of movements of the machine. In connection with a load-discharger of this type I make use of locking means for holding the load-discharger in its closed and reducing positions, and I also employ in connection therewith and with the valve mechanism interlocking stops or limiters, one of which is movable in unison with a thrust-rod connected with the valve mechanism and operated by the valve-opening-actuating means.

Another feature of my invention is the provision of an improved regulator supported on the framework in the path of the material discharged from the load-receiver of the weighing mechanism and having an arm adapted to engage a suitable member on the closer and hold the latter open while the discharged material is passing the regulator.

Another feature of the construction which I deem of importance is an improved valve mechanism in which a self-closing stream-controlling valve is mounted within and preferably disposed substantially centrally of the supply-spout and has its closing movement regulated by the descent of the beam mechanism on the making up of a load or overload in the receiver. I prefer to locate above this valve a fixed stream-supporting member in such a position as to deflect or shed the material and relieve the valve from the pressure of the mass in the upper part of the supply-spout or other source from which the material flows, the valve being also in the preferred construction so shaped as to shed the substance and rise easily, when operated by the valve-opening actuator, without raising with it a large mass.

It will be obvious that a valve so formed as to be substantially the shape of an inverted V can be opened readily by the actuator and will also oppose a sufficiently large portion of its surface to the action of the material flowing through the supply-spout to cause it to close readily when the connections between the valve and the beam mechanism are withdrawn on the descent of the load-receiver.

Figure 2:
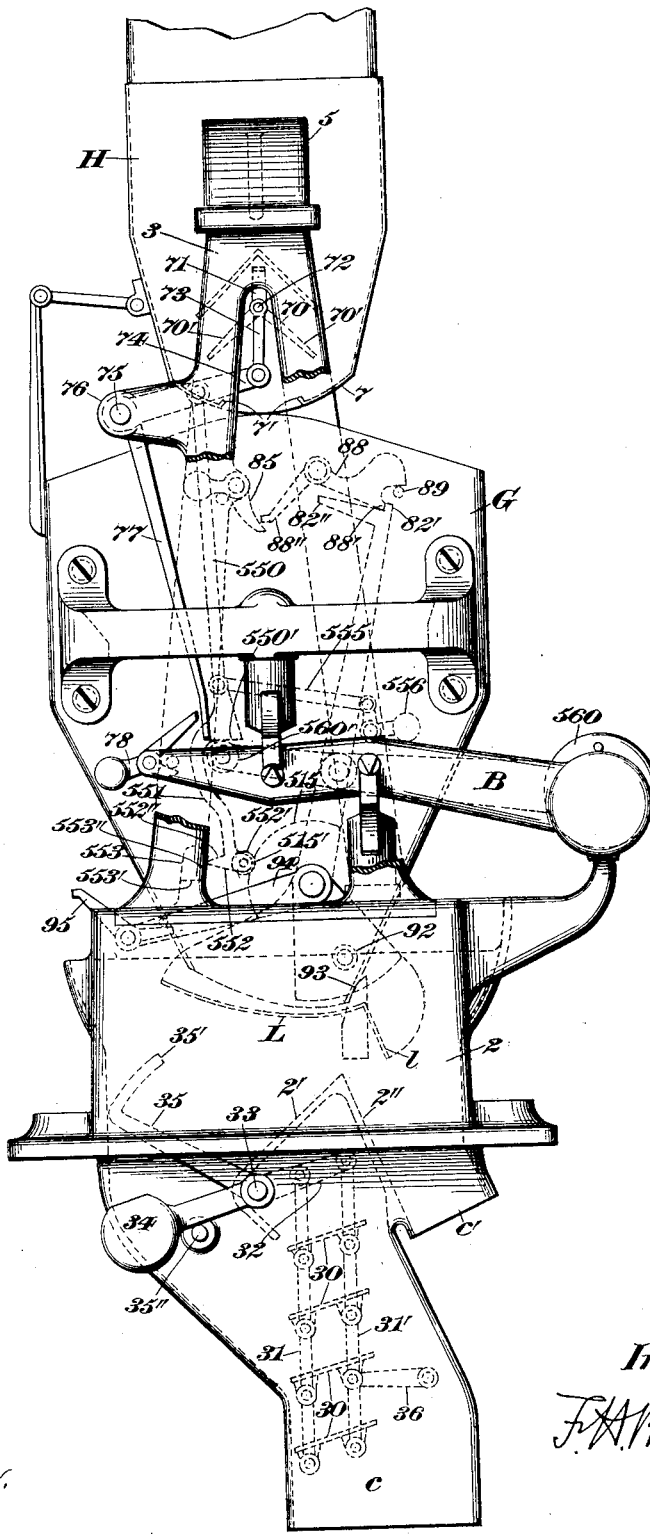
Figure 3:
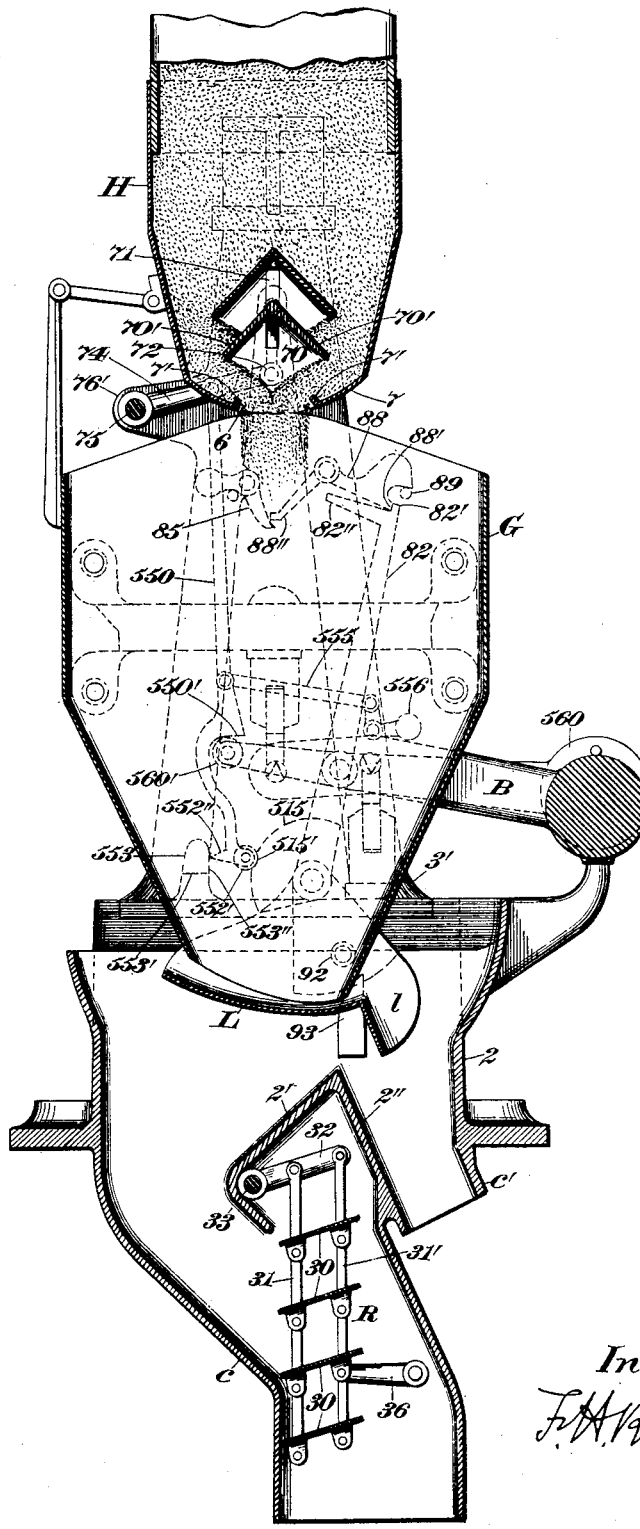
Figure 4:
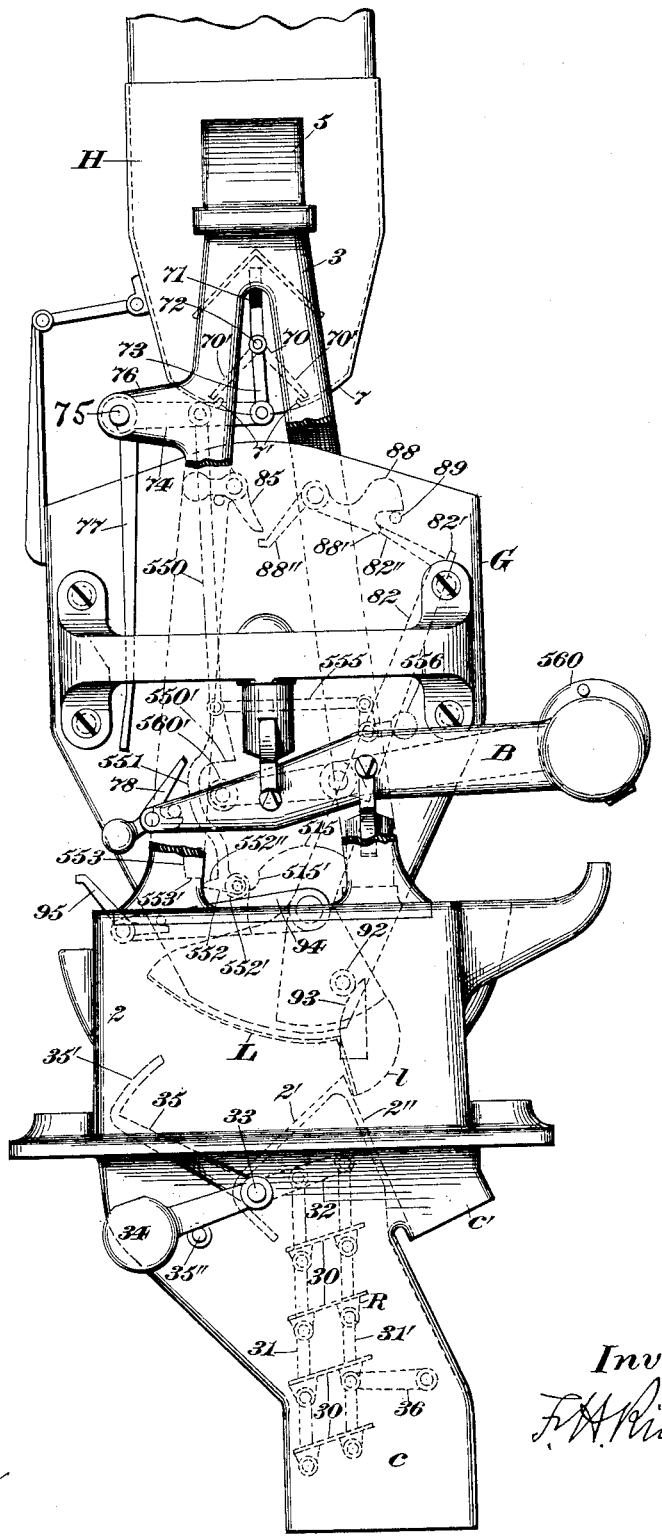
Figure 5:
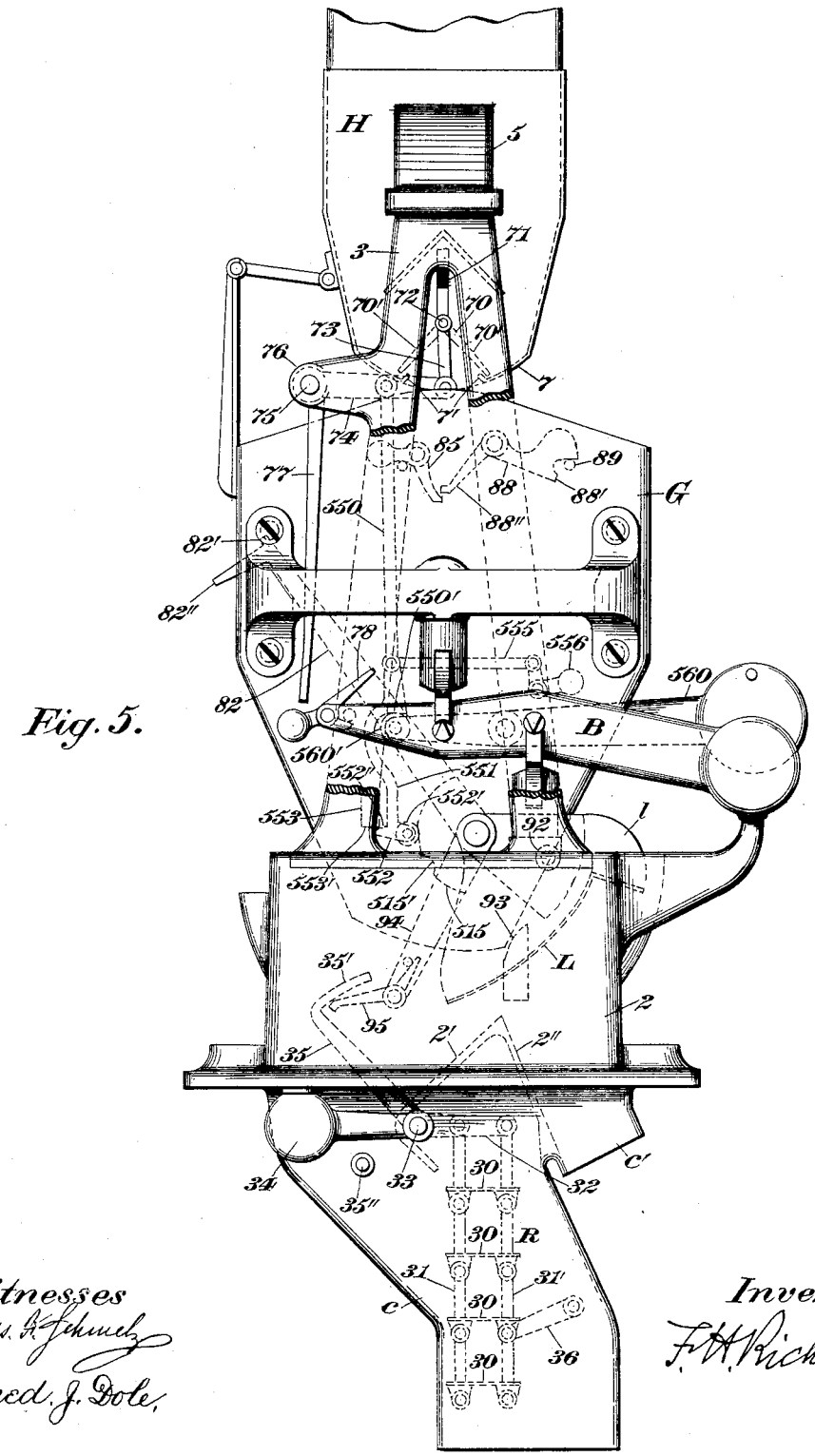
Figure 6:
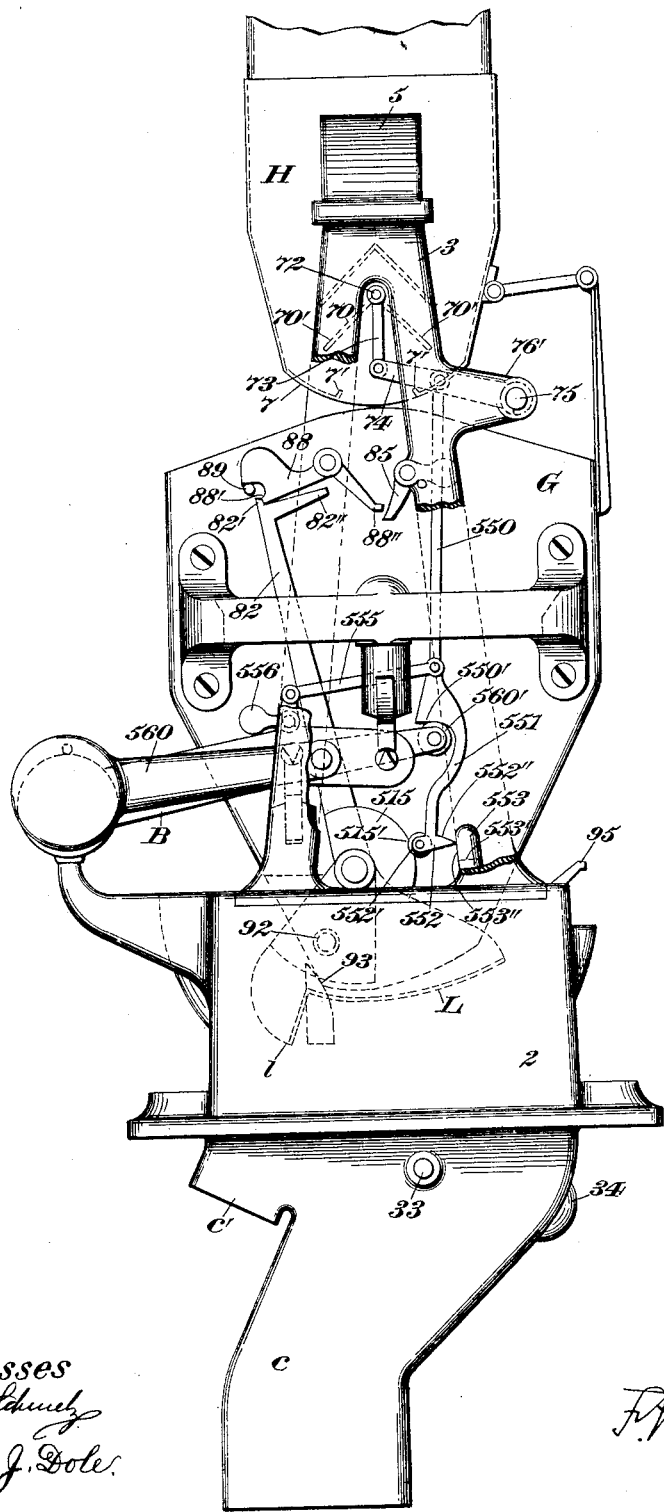

In the drawings accompanying and forming part of this specification, Figure 1 is a front elevation of a weighing-machine constructed in accordance with my present improvements, parts being broken away to show the construction more clearly. Fig. 2 is a side elevation of the same, looking from the right hand in Fig. 1 and showing the valve open and the closer shut, as they appear at the beginning of the operation of supplying material to the load-receiver, portions of the framework being broken away. Fig. 3 is a vertical longitudinal section of the same, the parts being in the positions in which they are shown in Fig. 2. Fig. 4 is a side elevation of the machine, showing the valve closed and the load-discharger in position for reducing the overload to a true load by permitting the efflux of the excess. Fig. 5 is a similar view of the machine, illustrating the positions of the parts when the load-discharger is tripped to discharge the completed true load and is locked open by the action of the regulator; and Fig. 6 is a side elevation of the machine with the parts in the positions illustrated in Fig. 2, the view being taken from the opposite side of the machine, however, and parts being broken away to illustrate the construction clearly.

Similar characters designate like parts in all the figures of the drawings.

Any suitable framework may be employed for supporting the several operative parts of my improved weighing mechanism. In the present construction this framework consists of a pair of side frames or uprights 3 and 3', connected at their upper ends by a cross-beam or top plate 5 and supported at their lower ends on a suitable base—such, for example, as the chambered supporting-base 2—which is divided by the partitions 2' and 2'', so as to form two discharge chutes or outlets, the main chute being extended a considerable distance below the base and designated in a general way by $c$, while the smaller chute, through which the excess of material is intended to be discharged from the load-receiver, is designated by $c'$ and discharges at one side of the main discharge-spout and at some distance above the lower end of the latter.

The cross-beam 5 carries the usual supply hopper or spout H; but this, instead of having a large discharge-opening at its lower end, has an opening of relatively small area as compared with the cross-sectional area of the body of the chute. This discharge-outlet, however, will usually extend from end to end of the hopper and will of course be of sufficient width to supply to the load-receiver a stream of material of full size. This outlet is indicated herein at 6 and is formed by a substantially oblong opening in the bottom of the chute H. This bottom wall is indicated by 7 and preferably has inturned flanged portions 7' at the longitudinal edges of the walls of the opening for a purpose which will be hereinafter specified.

The valve which I employ in the present case is mounted within the supply chute or hopper H and is adapted to reciprocate toward and from the opening 6. This valve is designated in a general way by 70 and is disposed substantially centrally of the hopper H, so that a free space will be left between the valve and the walls of the hopper for permitting the flow of a relatively large stream of material through the opening 6 and to the load-receiver of the weighing mechanism. This valve may be of any type suitable for cutting off the supply of material while working within the hopper, but I prefer to employ a self-closing valve so positioned that the stream of material will tend to carry the valve with it as the stream flows through the hopper, premature closing movement being prevented in this case by connections from the valve to the beam mechanism which will permit the closing of the valve only as the beam descends. As it will be obvious, however, that it would be extremely difficult to open the valve again at the beginning of the making up of a new load in the receiver if the pressure of the entire mass of material in a large supply-hopper connected with a bin or other storage vessel were exerted upon the valve I purpose to employ in connection with the valve a suitable stream supporting and deflecting member located above the valve and so constructed as to deflect or shed the material passing through the hopper just before it reaches the valve, and thus relieve the latter from undue pressure during its opening movement. Moreover, the organization of the parts preferably will be such that a relief space or chamber will be left between the valve and the superposed stream-supporting member to accommodate the laterally-displaced material in the hopper when the valve is raised.

In the construction illustrated in the drawings both the fixed stream-supporting member and the valve are so constructed as to deflect the stream, they being, preferably, substantially of inverted-V shape and the valve being of such size as to cover only the discharge-outlet 6 in the hopper without obstructing when in its normal open position the free flow of the material through and from the hopper. This valve 70 should, however, be sufficiently large to cover this opening entirely when closed, and the stream-deflecting walls 70' thereof will preferably be so located that their lower edges will overlap the flanges 7', rising from the bottom wall of the hopper, and thereby effectually prevent the leaking out of small supplies of material after the valve is closed. It will be clear that this construction of the flanges and the walls of the valve forms a close joint at a point where the material would be likely to leak through on account of the vibration of the mechanism if such an organization of devices were not provided.

The valve 70 is mounted for vertical reciprocation within the hopper, it having at its ends rounded guide-pins 72, working in vertical guideways 71 in the end walls of the hopper, these guide-pins being connected in this instance by means of links 73 with corresponding rock-arms 74, secured to a rock-shaft 75, mounted for oscillation in brackets 76 and 76', extending from the side frames 3 and 3'.

The rock-shaft 75 may be employed for the purpose of carrying the usual drip-lever 77, controlled by a suitable by-pass stop, such as 78, on the beam mechanism of the machine. The construction and operation of this lever and by-pass are well understood and need not be referred to in detail.

As the closing movement of the valve will be dependent upon the descent of the beam mechanism I make use of the usual thrust-rod 550, which will serve to hold the valve up until the beam mechanism begins to descend, whereupon, of course, the pressure of the material in the hopper H will be sufficient to actuate the valve first to its reducing and subsequently to its cut-off position.

The load-receiver of the weighing mechanism is designated in a general way by G and is mounted in a well-known manner upon knife-edge bearings carried by beam mechanism, (designated herein by B.) This beam mechanism may be of any suitable type, but in this instance comprises a single beam having a pair of beam-arms carried by the usual knife-edges on bearings rising from the base of the machine. The beam mechanism carries the valve-opening actuator, which will be in the form of a counterweighted lever 560 of the usual construction, this lever having its inner end in position to coöperate with the transverse face 550' of the thrust-rod 550, the latter being curved below said face in such manner as to form an extension 551 of a shape to permit the operation of the antifriction-roll 560' at the end of the lever 560 without interfering therewith. At its lower end the rod 551 has a transverse member 552, which forms a stop or limiter for blocking the opening movement of the load-discharger or closer while the valve is open, the upper side of the outer end of the stop 552 being shaped to form a cam-face, while the inner end of said stop carries an antifriction-roll adapted to coöperate with the usual rocker 515 on the closer. This rocker has a peripheral surface the major portion of which is defined by an arc struck from the center of oscillation of the rocker, but at one point in such surface there is a recess or concavity 515' in which the roll 552' will lie when the closer is shut.

The cam-face 552" is intended to coöperate with a stop-face 553' on an arm 553, projecting upwardly and inwardly from the base of the machine. (See Fig. 1.) The inner vertical side of this arm 553 forms a stop-face 553", against which the outer end of the stop 552 will abut when the closer is shut.

It will be clear that the rocker 515, the stop 552, and the stop-arm 553 are so constructed and organized as to coöperate to prevent the opening movement of the valve while the closer is open and also prevent the opening movement of the closer while the valve is open, the rocker and the stop 552 constituting reciprocally-effective valve-opening-movement and load-discharging-movement limiters, the former of which is operative with the load-discharger or closer and the latter with the thrust-rod which actuates the valve to open the same. The load-discharging-movement or closer-opening-movement limiter is in the present case intended to interlock not only with the rocker, but is also locked and positioned by the fixed locking-stop 553, it being apparent that when the stop 552 is in the position shown in Figs. 4 and 5 it cannot rise until it is released from engagement with the stop-face 553' and that when in engagement with the stop-face 553" it cannot be released from engagement with the wall 515' of the peripheral recess in the rocker.

For the purpose of withdrawing the stop 552 of the thrust-rod from the stop-face 553' I prefer to employ connections for actuating the thrust-rod to return it normally to the position shown in Fig. 2. These connections may comprise a link 555 and a counterweighted angle-lever 556, supported on the framework and pivotally connected with such link.

The load-discharger employed in the present organization is in the form of a swinging closer (designated in a general way by L) mounted on the load-receiver so as to oscillate, as before stated, in opposite directions, its movement in one direction serving to uncover a small portion of the opening at the discharge end of the load-receiver G to thereby reduce an overload by removing the small excess of material from the receiver and its movement in the opposite direction acting to uncover the entire mouth of the load-receiver to discharge the completed load therefrom. This closer is mounted on the load-receiver for oscillation about an axis at one side of the center of the path of discharge of the material issuing from the bucket and has a curved load-supporting face eccentric to such axis of movement, the curvature of the closer-pan being such that the axis of the closer is nearest the load-reducing end of the latter.

The reducing end of the closer is nearest the discharge-chute c' in the base of the machine, and it is intended to deliver the surplus material thereinto, while the load-discharging end of the closer is adjacent to and delivers the completed load into the main discharge-chute c. The curvature of the closer-pan is such that the main portion of the closer forms a chute for directing the load into the discharge-chute c; but for the purpose of properly delivering into the discharge-chute c' the excess taken from the overload I prefer to provide at the reducing end of the closer a stream-directer—such, for example, as a stream-directing chute l—which is disposed with its bottom wall at a considerable angle to the bottom of the main portion of the closer.

The closer is counterweighted in the usual manner, so as to swing normally to its shut position, and as the axis thereof is at one side of the path of the discharged material and nearest to the reducing end of the closer the force of the stream will of course be sufficient to operate the closer to open the same when the load is to be delivered from the receiver, but as the closer is intended to swing in the opposite direction to reduce the overload to a true load it will be clear that some means should be provided for actuating the closer positively in the opposite direction when the excess is to be removed from the overload. As this excess is of course always taken out after the load-receiver has descended below the overpoising-line, any means employed for this purpose should be operative before the receiver and the beam mechanism rise again above the poising-line. Hence I may make use of the force exerted by the descending weighted load-receiver to swing the closer in a direction for reducing the load. In the present case I have shown an antifriction-roll 92 on the side of the closer and a fixed cam 93 on the inside of the chambered base 2 of the machine, this cam being so located and its face so curved as to actuate the closer, on the descent of the bucket below the over-poising-line, from the position shown in Figs. 2 and 3 to that illustrated in Fig. 4, the area of discharging-opening uncovered being dependent upon the position of the receiver.

The closer will of course be latched or locked against opening movement when in its closed position, and it should also be latched in a similar manner when in its load-reducing position in order to prevent any stoppage of the reducing action until all of the excess has been removed from the overload. Hence I employ, in connection with the closer, means for latching the same in these two positions, the closing having in the present case a long stop-arm 82 oscillatory therewith and carrying at its upper end two stops 82' and 82", the former of which is intended to coöperate with latch-tripping means to latch the closer shut and the latter to latch the closer in the load-reducing position. The latch which I employ for this purpose is illustrated at 88 and is counterweighted, so as to hold its detent-face 88' normally in position for engaging one of the stops 82' and 82". A fixed stop 89 is shown for limiting the movement of the latch.

It will be evident, of course, that when the load-receiver goes below the position shown in Fig. 4 the area of the load-reducing opening will be greater than shown in said figure, and hence the stop-arm 82 and the stop 82" will be thrown farther to the right than as seen in said figure, and on the subsequent ascent of the receiver the return movement of the closer will be checked by the abutment of the stop 82" against the detent-face 88' of the latch. This latch is of the "by-pass" type and is intended to be tripped by a latch-tripper in the form of a by-pass stop 85, this tripper being so constructed that on the descent of the bucket the arm 88" of the latch will pass by the same, but on the ascent of the bucket to the poising-line will be tripped by the stop 85, which will then operate as a fixed member.

From the foregoing description of the closing means or load-discharger it will be seen that the closer has two material-discharging movements and an intermediate movement, all of which take place in a common path during a single cycle of movements of the weighing mechanism, the material-discharging movements being in this case caused by the oscillation of the closer in opposite directions, while the intermediate or return movement is in the direction of the swinging of the closer for discharging the completed load. Moreover, as the areas of discharge-opening uncovered by the respective material-discharging movements of the closer are different the closing means will usually have differential load-reducing and load-discharging oscillatory movements, the former of which serves to uncover a discharge-opening of sufficient size to permit the efflux of a small portion of the material to thereby reduce the overload, while the latter serves to uncover a discharge-outlet of sufficient size to permit the efflux of the entire completed load, and these movements will be discontinuous, so as to permit an intermediate or return movement of the closing means to the normal shut position thereof. While a single discharge-outlet is shown in this instance to permit the reduction and subsequent discharge of the load, it will be obvious that this opening or outlet need not necessarily be a single or continuous one, but that I include within the meaning of the term any continuous discharge-outlet or set of coacting separated openings or spaces having the load-reducing and load-discharging functions just described.

In connection with the mechanism hereinbefore described, and especially with the closer, I make use of a regulator for preventing the making up of a new load until all of the material of a discharged load has passed through the discharge-chute of the machine. This regulator is designated in a general way by R, and in the construction shown herein is supported on the framework within the main discharge-chute c, and has an arm for holding the closer open while material is passing the regulator and through the discharge-chute. This regulator is counterweighted and comprises an oscillatory carrier and a series of superposed connected regulator-blades connected with the carrier at different points with respect to the axis of movement thereof, the connections being made, preferably, at different distances from the axis of the carrier.

In the construction illustrated the regulator-blades, which are designated by 30, are disposed in parallelism with each other and are pivotally connected at their opposite ends with connecting-rods, one pair of connecting-rods 31 and 31' being shown at one end of the machine and a corresponding pair at the opposite end. These connecting-rods are pivoted to arms 32, secured to a rock-shaft 33, mounted for oscillation in bearings at opposite sides of the discharge-chute c, and a counterweighted arm extends from the rock-shaft toward the side thereof opposite the regulator-blades. A second arm 35 extends from the rock-shaft 33 on the same side thereof with the counterweight 34, and has a transverse latch 35', adapted to engage a by-pass stop 95, carried by the rock-arm 94, oscillatory with the closer L. The closer and the regulator are so organized relatively to each other that when the closer is opened to discharge the load the stop 95 will pass by the latch 35', and immediately thereafter, when the regulator is carried to its regulating position by the discharged material, it will be engaged by the latch 35' to lock the closer in its open position. On the return of the regulator to its normal idle position the latch 35' will release the stop 95 and permit the closer to shut. This normal position of the regulator will of course be limited by some suitable stop, such as the stud 35'', projecting from the side of the discharge-chute $c$. Moreover, for the purpose of guiding the regulator properly I prefer to connect to one of the rods 31' a guide-link, as shown at 36.

As the connecting-rods 31' are pivoted to the rock-arms 32 at points much farther from the axis of the shaft 33 than the connecting-rods 31 it will be clear that the sides of the regulator-blades farthest from such axis will have a much greater movement than those which are nearer, and hence while these blades will be disposed normally, so as to shed any material which may be left thereon at the end of a cycle of movements of the weighing mechanism, the shifting of the regulator to its regulating position will cause the regulator-blades to move and assume a substantially horizontal position and thereby, owing to the weight of the accumulated material thereon, oppose a maximum resistance to the premature return of the regulator after the discharge of a load from the receiver.

The operation of a weighing-machine constructed in accordance with my present improvements is as follows: It being understood that the parts are in the positions shown in Fig. 2, with the valve wide open and delivering material to the load-receiver, while the closer is latched shut and the regulator is in its normal idle position, it will be seen that as soon as an overload is supplied to the load-receiver the latter will descend from the position shown in Fig. 2 to that illustrated in Fig. 4, whereupon the drip-lever 77 will be released by the by-pass stop 78 and the valve permitted to close. It will be noticed that during this descent of the load-receiver just mentioned the valve-opening actuator 560 is withdrawn from the thrust-rod 550, which withdrawal permits the valve to be closed by the pressure of the material contained in the hopper H. On the descent of the load-receiver below the overpoising position the latch 88 passes by the stop 85, and the cam-face 93 carries the roll 92, and consequently the closer L, to the left, as seen in Fig. 4, and partially opens the mouth of the load-receiver at the right-hand side of such discharge-opening, and thus causes the reduction of the overload by the removal of the excess therefrom. The closing of the valve causes the descent of the thrust-rod 550, and hence of the stop 552, which passes below the stop-face 553'' and into position to be engaged by the stop-face 553'. As soon as it reaches this position the rocker 515, being unlocked, forces the antifriction-roll 552' out from the recess 515' and onto the shorter convex portion of the periphery of the rocker, thus locking the valve against opening. As soon as all the surplus material passes out from the receiver the latter rises, and the latch 88, which on the shifting of the closer to its load-reducing position engages the stop 82'' to latch the closer in such position, is tripped by the latch-tripper 85, and the closer is opened to discharge the completed true load. (See Fig. 5.) The opening of the closer causes the oscillation of the rocker 515 to a point where the longer peripheral surface thereof becomes effective to block the opening of the valve. When the closer opens, the stop 95 thereon, passing by the latch 35', is engaged by the latter as soon as the material shifts the regulator to the position shown in Fig. 5. The closer will be held in this position by the regulator until all of the material passes through the chute $c$, whereupon the regulator returning to its normal idle position will release the stop 95, the closer will shut, the counterweight 556 will withdraw the stop 552 from the stop-face 553', and the counterweighted valve-opening actuator 560 will become operative to reopen the valve for the delivery of material for a new load.

Having described my invention, I claim—

1. In weighing mechanism, the combination of a load-discharger adapted to discharge an entire completed load and having material-discharging movements and an intermediate movement during a single cycle of operation of said mechanism, and means for actuating said load-discharger.

2. In weighing mechanism, the combination of a reciprocatory load-discharger adapted to discharge an entire completed load and having material-discharging movements and an intermediate return movement during a single cycle of operation of said mechanism, and means for actuating said load-discharger.

3. In weighing mechanism, the combination of an oscillatory load-discharger adapted to discharge an entire completed load and having material-discharging movements and an intermediate return movement during a single cycle of operation of said mechanism, and means for actuating said load-discharger.

4. In weighing mechanism, the combination of a reciprocatory load-discharger having opposite material-discharging movements and an intermediate movement in a common path during a single cycle of operation of said mechanism, and means for actuating said load-discharger.

5. In weighing mechanism, the combination of a reciprocatory load-discharger having opposite differential material-discharging movements and an intermediate movement in a common path during a single cycle of operation of said mechanism, and means for actuating said load-discharger.

6. In weighing mechanism, the combination, with a counterpoised load-receiver having discharge-outlet; of a closer for said outlet, supported and operable for successive material-discharging movements and adapted to have an intermediate movement to close the outlet, whereby the load may be discharged first slowly and then rapidly, and whereby also such load may first be reduced and afterward entirely discharged.

7. The combination, in weighing mechanism, of a load-receiver having a discharge-opening therein; a closer for said load-receiver, having a plurality of discontinuous movements for uncovering said discharge-opening during a single cycle of operation of the weighing mechanism; and means for actuating said closer.

8. The combination, in weighing mechanism, of a load-receiver having a discharge-opening therein; a closer for said load-receiver, having discontinuous differential load-reducing and load-discharging movements during a single cycle of operation of the weighing mechanism; and means for actuating said closer.

9. The combination, in weighing mechanism, of a load-receiver having a discharge-opening therein; closing means for said load-receiver, having opposite opening movements for uncovering said discharge-opening from opposite ends thereof during a single cycle of operation of the weighing mechanism; and means for actuating said closing means.

10. The combination, in weighing mechanism, of a load-receiver having a discharge-opening therein; and an oscillatory closer therefor having opposite material-discharging movements during a single cycle of operation of the weighing mechanism, and also having its axis of movement at one side of the center of the path of discharge of the load; and means for actuating said closer.

11. The combination, in weighing mechanism, of a load-receiver having a discharge-opening therein; an oscillatory closer for said load-receiver, having load-reducing and load-discharging movements in opposite directions during a single cycle of operation of the weighing mechanism, and also having its axis of movement at that side of the center of the path of discharge of the load nearest the load-reducing end of the closer; and means for actuating said closer.

12. The combination, in weighing mechanism, of a load-receiver having a discharge-opening therein; closing means for said load-receiver, having material-discharging movements and an intermediate movement in a common path during a single cycle of operation of the weighing mechanism; and an actuating member for imparting one of said movements to the closing means.

13. The combination, in weighing mechanism, of a load-receiver having a discharge-opening therein; closing means for said load-receiver, having load-reducing and load-discharging movements and an intermediate movement in a common path during a single cycle of operation of the weighing mechanism; and an actuating member for imparting said load-reducing movement to the closing means.

14. The combination, in weighing mechanism, of a load-receiver having a discharge-opening therein; closing means therefor having material-discharging movements and an intermediate movement in a common path during a single cycle of operation of the weighing mechanism; and a fixed actuating member in position for imparting one of said movements to the closing means during one of the movements of the load-receiver.

15. The combination, in weighing mechanism, of a load-receiver having a discharge-opening therein; closing means therefor having opposite load-reducing and load-discharging movements and an intermediate movement in a common path during a single cycle of operation of the weighing mechanism; and a fixed actuating member for imparting said load-reducing movement to the closing means during the descent of the load-receiver.

16. The combination, in weighing mechanism, of a load-receiver having a discharge-opening therein; and an oscillatory closer therefor oppositely movable for reducing and discharging the load, and having a curved load-supporting face eccentric to its axis of movement.

17. The combination, in weighing mechanism, of a load-receiver having a discharge-opening therein; and an oscillatory closer therefor oppositely movable for reducing and discharging the load, and having a stream-director at the load-reducing side thereof.

18. The combination, in weighing mechanism, of a load-receiver having a discharge-opening therein; and an oscillatory closer therefor oppositely movable for reducing and discharging the load, and having a stream-directing chute at the load-reducing side thereof.

19. The combination, in weighing mechanism, of a load-receiver having a discharge-opening therein; a reciprocatory closer therefor oppositely movable for reducing and discharging the load; closer-latching means for latching the closer in its closed and load-reducing positions successively; and latch-tripping means operative on the ascent of the load-receiver.

20. The combination, in weighing mechanism, of a load-receiver having a discharge-opening therein; a reciprocatory closer therefor oppositely movable for reducing and discharging the load; a pair of stops movable in unison with the closer; a by-pass latch for engaging said stops successively to latch the closer in its closed and load-reducing positions, respectively; and a by-pass-latch tripper operative on the ascent of the load-receiver.

21. In a weighing-machine, the combination, with stream-supplying means, of a valve; a load-discharger; a valve-opening actuator; a valve-opening thrust-rod; and reciprocally-effective valve-opening-movement and load-discharging-movement limiters operative, respectively, with the load-discharger and with the valve-opening thrust-rod.

22. In a weighing-machine, the combination, with stream-supplying means, of a valve; a load-receiver; a closer; a valve-opening actuator; a valve-opening thrust-rod; reciprocally-effective valve-opening-movement and closer-opening-movement limiters operative, respectively, with the closer and with the valve-opening thrust-rod; and a fixed locking-stop in position and adapted to lock the closer-opening-movement limiter against movement while the closer is open.

23. In weighing mechanism, the combination, with framework, of a load-receiver having a closer; and a counterweighted closer-locking regulator supported on the framework and having a closer-locking arm adapted for holding the closer open while the regulator is in its regulating position.

24. In a weighing mechanism, the combination, with framework, of a load-receiver having a closer; a counterweighted closer-locking regulator supported on the framework and having a closer-locking arm adapted for holding the closer open while the regulator is in its regulating position; and a by-pass stop carried by the closer and adapted to be engaged by the arm on the regulator.

25. In weighing mechanism, the combination, with stream-supplying means and with a load-receiver, of a load-discharger; and a regulator comprising a counterweighted oscillatory carrier and a series of superposed connected regulator-blades pivotally connected with the carrier at different points relatively to the axis of the latter.

26. In weighing mechanism, the combination, with stream-supplying means and with a load-receiver, of a load-discharger; and a regulator comprising a counterweighted oscillatory carrier and a series of superposed connected regulator-blades pivotally connected with the carrier at different distances from the axis of the latter.

27. In weighing mechanism, the combination, with stream-supplying means and with a load-receiver, of a load-discharger; and a regulator comprising a rock-shaft, rock-arms adjacent to opposite ends of said rock-shaft, a pair of connecting-rods pivoted to the rock-arms at each end of said rock-shaft, and parallel regulator-blades pivoted at their ends to the connecting-rods of each pair.

28. In weighing mechanism, the combination, with a supply-spout, beam mechanism, and a load-receiver, of a self-closing valve located within said supply-spout in the path of the material flowing through the spout, said valve having its closing movement controlled by the descent of the beam mechanism.

29. In weighing mechanism, the combination, with a supply-spout, of a valve located within the supply-spout in the path of the material flowing through the spout and reciprocatory toward and from the discharge end of the latter; and a superposed fixed stream-supporting member for relieving the pressure on the valve.

30. In weighing mechanism, the combination, with a supply-spout, of a stream-deflecting valve located within the supply-spout in the path of the material flowing through the spout and reciprocatory toward and from the discharge end of the latter; and a superposed fixed stream-supporting member for relieving the pressure on the valve.

31. In weighing mechanism, the combination, with a supply-spout having a discharge-opening of relatively small area; of a valve located within the supply-spout, above said discharge-opening and disposed substantially centrally of the spout in the path of the material flowing through the latter and reciprocatory toward and from said discharge-opening; and a superposed fixed stream-supporting member for relieving the pressure on the valve.

32. In weighing mechanism, the combination, with a supply-spout having a discharge-opening of relatively small area; of an inverted-V-shaped valve located in the supply-spout, above said discharge-opening and disposed substantially centrally of the spout in the path of the material flowing through the latter and reciprocatory toward and from said discharge-opening; and a superposed fixed stream-supporting member for relieving the pressure on the valve.

FRANCIS H. RICHARDS.

Witnesses:
F. N. CHASE,
ANDREW FERGUSON.